(12) United States Patent
Sugiyama et al.

(10) Patent No.: US 7,203,558 B2
(45) Date of Patent: Apr. 10, 2007

(54) METHOD FOR COMPUTING SENSE DATA AND DEVICE FOR COMPUTING SENSE DATA

(75) Inventors: Fumihiko Sugiyama, Yokohama (JP);
Takanori Nakajima, Yokohama (JP);
Masaaki Tago, Yokohama (JP);
Kazumasa Suzuki, Yokohama (JP)

(73) Assignee: Open Interface, Inc., Kanagawa-Ken (JP)

( * ) Notice: Subject to any disclaimer, the term of this patent is extended or adjusted under 35 U.S.C. 154(b) by 880 days.

(21) Appl. No.: 10/162,415

(22) Filed: Jun. 3, 2002

(65) Prior Publication Data

US 2003/0014215 A1    Jan. 16, 2003

(30) Foreign Application Priority Data

Jun. 5, 2001    (JP) .......................... P2001-170102

(51) Int. Cl.
*G06F 17/00*    (2006.01)

(52) U.S. Cl. .............................. 700/94; 84/616; 381/56

(58) Field of Classification Search .................. 381/56, 381/98, 61; 700/94; 84/615, 616
See application file for complete search history.

(56) References Cited

U.S. PATENT DOCUMENTS

| | | | | |
|---|---|---|---|---|
| 4,611,343 A | * | 9/1986 | Rapaich ...................... | 381/103 |
| 4,797,931 A | * | 1/1989 | Furukawa et al. ............. | 381/56 |
| 5,528,255 A | * | 6/1996 | Hagimori ..................... | 345/35 |
| 6,711,270 B2 | * | 3/2004 | Masuda ....................... | 381/309 |
| 2002/0037083 A1 | * | 3/2002 | Weare et al. ................. | 381/58 |
| 2002/0172372 A1 | * | 11/2002 | Tagawa et al. ............... | 381/56 |

FOREIGN PATENT DOCUMENTS

| | | |
|---|---|---|
| JP | 59-88184 A1 | 5/1984 |
| JP | 5-12023 A1 | 1/1993 |

(Continued)

OTHER PUBLICATIONS

Katsunori Murata, Yasushi Yamauchi and Miwako Doi, "Interactive 3D CG Animation Using MDI—Music Driven CG-" Information Processing Society of Japan SIG Notes "Human Interface" 97-H1-74, pp. 1-6, Sep. 12, 1997.

(Continued)

*Primary Examiner*—Vivian Chin
*Assistant Examiner*—Jason Kurr
(74) *Attorney, Agent, or Firm*—Darby & Darby

(57) ABSTRACT

A method and a device for computing sense data, which automatically compute data relating to feelings or senses generated by the human sensations by analyzing signals, such as audio signals, relating to the sensations. In the device, a MP3 decoder storing unit stores digital sound data which has been recorded using MP3 system. A decompression unit decompresses MP3 data which has been decompressed, and outputs as sound pressure value data at each frequency area. A sense data computation unit includes a feeling analysis unit and a rhythm analysis unit. The rhythm analysis unit obtains count of beats per unit time based on the sound pressure value data. The feeling analysis unit obtains a few kinds of feeling parameter values based on the sound pressure value data, determines the kind and level of feelings based on the value of feeling parameter and the count of beats per unit time, and writes the results thereof into a sense data accumulation unit.

4 Claims, 4 Drawing Sheets

FOREIGN PATENT DOCUMENTS

| | | |
|---|---|---|
| JP | 9-16800 A1 | 1/1997 |
| JP | 9-138767 A1 | 5/1997 |
| JP | 2001-117581 A1 | 4/2001 |
| JP | 2002-215195 A1 | 7/2002 |

OTHER PUBLICATIONS

Makoto Muto et al., "Sentimental-information detection by music coginition model", Information Processing Society of Japan SIG Noties [Music Information Science] 2000—MUS-36, pp. 25-30, Aug. 5, 2000.

Takashi Taniguchi, "Construction of an affective value scale of music and examination of relations between the scale and a multiple mood scale", The Japanese Journal of Psychology, vol. 65, No. 6, 463-470, Feb. 1995.

Norihisa Furuta et al., "The Design of the Notation Similarity for Melody Retrieval System" 56th Information Processing Society of Japan (First half of year 1998) Zenkoku Taikai Kouen Ranbun-shu, 4M-1, pp. 2-40-2-41, 1998.

Masaki Nakayama et al., "Recognition of Popular Songs from a Radio/TV Music Program" 56th Information Processing Society of Japan (First half of year 1998) Zenkoku Taikai Kouen Ronbun-shu, 4M-8, pp. 2-54-2-52, 1998.

Masataka Goto and Yuji Hashimoto "A Distributed Cooperative System to Play MIDI Instruments-toward a Remote Session", Information Processing Society of Japan SIG Notes "Musing Information Science" 93-MUS-4, pp. 1-8, Dec. 10, 1993.

Masataka Goto and Yoicho Muraoka "A Real-Time Beat Tracking System for Musical Acoustic Signals", Information Processing Society of Japan SIG Notes "Musing Information Science" 94-MUS-7, pp. 49-56, Aug. 6, 1994.

Masataka Goto and Yoichi Muraoka "Parallel Implementation of a Real-Time Beat Tracking System—Real-time Musical Information Processing of AP1000-", Parallel Processing Symposium JSPP '95 Ronbun-shu pp. 353-360, May 15, 1995.

Masataka Goto "Can Computer Bea Rhythm in Accordance with Music—Real-time Beat Tracking System", bit, vol. 28, No. 3, pp. 4-11, Mar. 1, 1996.

Tsutomu Kanamori, Hiroshi Hirai et al., "Extraction of Sentimental Information with Chord Progression and Melody Part", Information Processing Society of Japan SIG Notes [Human Interface] 92-H1-45, pp. 75-79, Nov. 12, 1992.

Makoto Yokota et al., "On a Small Volume Number Systems of the Normed Music Mesh Patterns", 56th Information Processing Society of Japan (First half of year 1998) Zenkoku Taikai Kouen Ronbun-shu, 3M-4, pp. 2-30-2-31, 1998.

Tomoyoshi Kinoshita et al., "Music Note Recognition Based on Prdiction of Notes", 56th Information Processing Society of Japan (First half of year 1998) Zenkoku Taikai Kouen Ronbun-shu, 3M-5, pp. 2-32-3-33, 1998.

The Dictionary for Computer Music, Rittoh Co., pp. 133, 147, 151, 192 and 193 (1991).

Qi Wang, Naoki Saiwaki, and Shogo Nishida "An Approach to Animation Synthesis based on Music Information", The Institute of Electronics, Information and Communication Engineers [Human Communication Basis] HCS 2001-15, pp. 33-40, Jun. 8, 2001.

\* cited by examiner

METHOD FOR COMPUTING SENSE DATA AND DEVICE FOR COMPUTING SENSE DATA

BACKGROUND OF THE INVENTION

1. Field of the Invention

The present invention relates to a device for analyzing signals and outputting results of the analysis. More specifically, the present invention relates to a device for analyzing signals relating to human sensations, such as audition and vision in time sequence.

2. Background Art

In order to deal with information relating to human feelings or senses as digital data, it is conventionally required to directly input information, such as "happy", "sad", and "fear", into an information device, such as a computer.

Human feelings, such as those mentioned above, have a correlation with stimuli a person receives from the surrounding environment. One example of such stimuli is music which is perceived by the sense of hearing. That is, when a large number of audience members listen to certain common music, a majority of the audience will feel the same feeling, such as "happy", "sad", "feel good", and so forth.

SUMMARY OF THE INVENTION

The present invention takes into consideration the above-mentioned situations and has an object of providing a method and device for computing sense data by which data relating to feelings or senses caused by human sensations are automatically computed by analyzing audio signals, video signals, and signals relating to human feelings.

Also, another object of the present invention is to provide various devices to which the above-mentioned method and device for computing sense data are applied.

In order to achieve the above objects, the present invention provides a method for computing sense data, comprising the steps of inputting digital data in which a sound is expressed as a sound pressure value at each of divided frequency areas, and analyzing distribution of the sound pressure value at each of the frequency areas to compute sense data relating to the sound.

Also, in the method for computing sense data according to the present invention, the frequency areas as a whole is divided into ten or fewer frequency area groups, and the sense data is computed based on an average sound pressure value of each of the frequency area groups.

Also, in the method for computing sense data according to the present invention, the sense data is computed based on temporal transition of the distribution of the sound pressure value at each of the frequency areas.

Also, in the method for computing sense data according to the present invention, the sense data is computed based on a manner of temporal transition of a frequency area having a peak of the sound pressure value in the frequency area groups.

Also, in the method for computing sense data according to the present invention, count of beats per unit time of a rhythm contained in the sound is obtained based on the digital data, and the sense data is computed based on the count of beats per unit time.

Note that one of the methods to obtain the count of beats per unit time of a rhythm is to obtain an amount of change in the sound pressure value at each frequency area with respect to time, detect a noise based on distribution of region over the entire frequency area at which the above-mentioned amount of change with respect to time exceeds a predetermined threshold value, and obtain the above-mentioned count of beats per unit time based on the detection frequency of the noise.

Also, in the method for computing sense data according to the present invention, feeling parameter values of five kinds of feeling comprising "pleasure", "surprise", "fear", "happy", and "sad" are computed based on the distribution of the sound pressure value at each of the frequency areas, and the sense data is computed based on the feeling parameter values.

Also, the present invention provides a method for reproducing music including the steps of computing sense data using the sense data computing method as described above based on digital data in which music is expressed as sound pressure values at each of divided frequency areas; producing visual contents based on the sense data computed, and reproducing the music and displaying the visual contents in a synchronized manner.

Also, the present invention provides a method for distinguishing music, comprising the steps of computing sense data using the sense data computing method as described above based on digital data in which music is expressed as sound pressure values at each of divided frequency areas, and comparing the sense data with each other.

Also, the present invention provides a device for computing sense data which computes sense data relating to a sound by inputting digital data in which the sound is expressed as a sound pressure value at each of divided frequency areas, and by analyzing distribution of the sound pressure value at each of the frequency areas to compute sense data relating to the sound.

Also, the present invention provides a device for computing sense data including a rhythm analysis unit which obtains count of beats per unit time of a rhythm contained in the sound based on the digital data, and a feeling analysis unit which divides the frequency areas as a whole into frequency area groups of 10 or less, and computes sense data based on a sound pressure value of each of the frequency area group and the count of beats per unit time obtained by the rhythm analysis unit.

Also, the present invention provides a device for reproducing music, including a data storing unit which stores digital data in which a sound is expressed as sound pressure values at each of divided frequency areas; a sense data computation unit which computes sense data relating to the sound by analyzing distribution of the sound pressure values at each of the frequency areas; a visual content producing unit which produces visual contents based on the sense data computed by the sense data computation unit, and a decoder unit which decodes the digital data and outputs as audio signals, wherein a production of visual contents by the visual content producing unit and an output of the audio signals by the decoder unit are carried out in a synchronized manner.

Also, the present invention provides a program which makes a computer to execute a process of computing sense data relating to a sound by using inputted digital data in which the sound is expressed as a sound pressure value at each of divided frequency areas, and analyzing distribution of the sound pressure value at each of the frequency areas.

Also, the present invention provides a computer-readable recording medium in which a program is recorded which makes a computer to execute a process of computing sense data relating to a sound by using inputted digital data in which the sound is expressed as a sound pressure value at each of divided frequency areas, and analyzing distribution of the sound pressure value at each of the frequency areas.

DETAILED DESCRIPTION OF THE INVENTION

Figure 1:
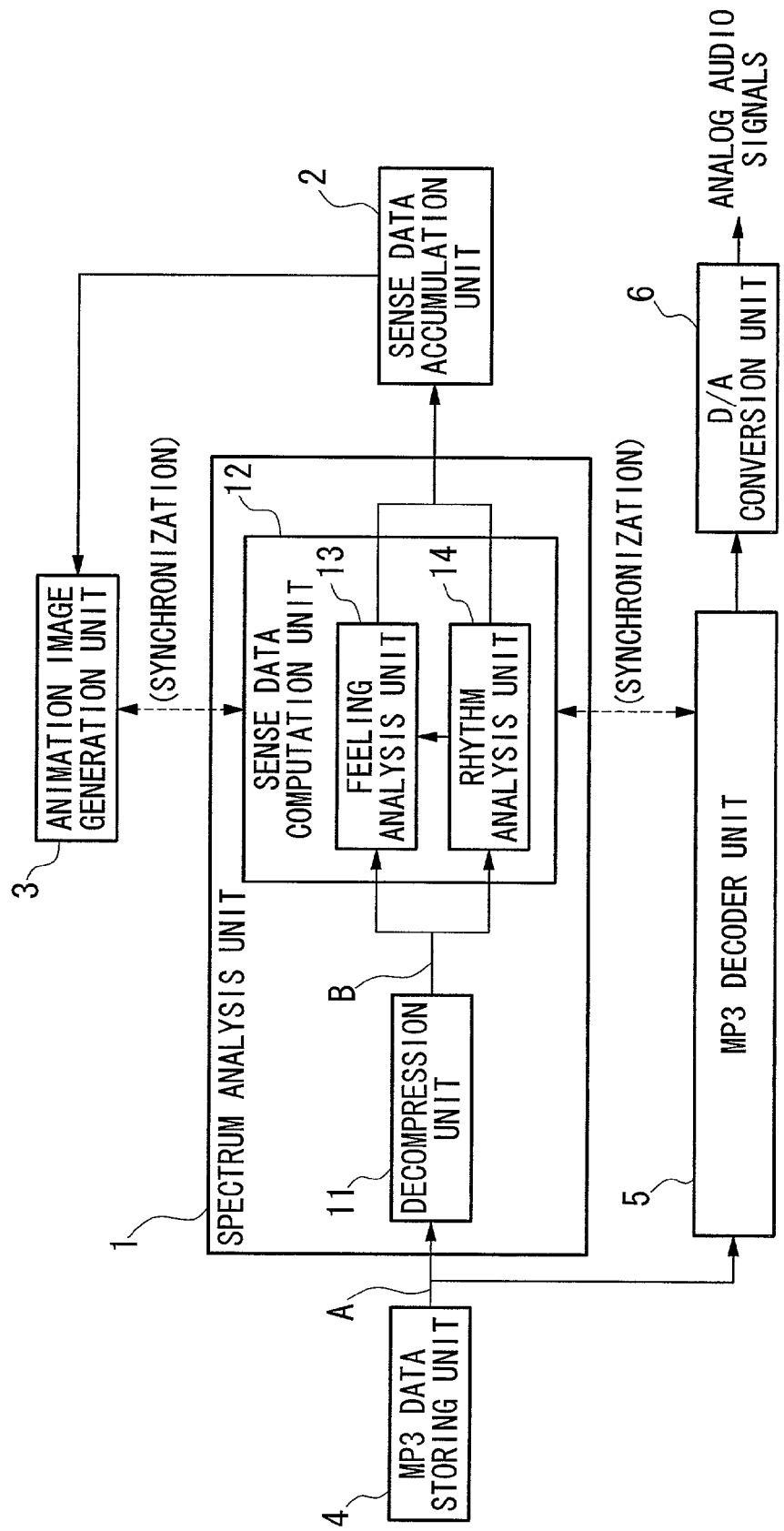
FIG. 1 is a block diagram showing the configuration of a music sound reproducing device to which a method for computing sense data according to an embodiment of the present invention is applied.

Hereinafter, an embodiment according to the present invention will be explained with reference to the attached drawings. FIG. 1 is a block diagram showing a structure of a music sound reproducing device to which a method for computing sense data according to an embodiment of the present invention is applied. The music sound reproducing device reproduces music (audition data), which is recorded using an MP3 (MPEG Audio Layer 3) system, and computes sense data based on the music.

In FIG. 1, the numeral 4 indicates an MP3 data storing unit which stores MP3 music data. The numeral 1 indicates a spectrum analysis unit which computes and outputs sense data based on the music data read from the MP3 data storing unit 4. The numeral 2 indicates a sense data accumulation unit which accumulates the sense data computed by the spectrum analysis unit 1. The numeral 3 indicates an animation image generation unit (visual contents generation unit), which sequentially reads the sense data accumulated by the sense data accumulation unit 2, and generates animation images (visual contents) based on the sense data.

Also, the numeral 5 indicates a MP3 decoder unit, which decodes the music data read from the MP3 data storing unit 4, and outputs sound pressure level digital signals (digital audio signals) in time sequence. The numeral 6 indicates a D/A (digital/analog) conversion unit, which converts the digital signals outputted from the MP3 decoder unit 5 into analog audio signals, and outputs the analog audio signals.

The music data stored in the MP3 data storing unit 4 is produced by converting a sound pressure level, which has been sampled at a predetermined sampling frequency (44, 100 Hz, for instance) and quantized, into a value of sound pressure at a corresponding frequency area, which is a unit obtained by dividing the entire frequency area by a predetermined number of frames (576, for instance) having a predetermined frame length (about 0.0261 sec, for instance), and by further compressing the obtained sound pressure values.

The spectrum analysis unit 1 reads the music data as above in time sequence, and analyzes the music data using a predetermined process, which will be described later, after decompressing the data. The spectrum analysis unit 1 sequentially outputs the results of analysis as sense data. The sense data output by the spectrum analysis unit 1 is also time series data and is sequentially accumulated in the sense data accumulation unit 2.

The animation image generation unit 3 produces animation which matches the music to be reproduced, and outputs it as video signals. An example of animation generated may be a character that dances in accordance with the rhythm of the music reproduced, and the movement of hands or legs, or facial expression of the character may change in accordance with the sense data read from the sense data accumulation unit 2. Also, the shape of the mouth (lips), eyes, or the surrounding muscle, for instance, of the animated character may be drawn to be varied in order to change the facial expression of the character.

Then, adjustment is made for the spectrum analysis unit 1, the animation image generation unit 3, and the MP3 decoder 5 so that the operation thereof may be synchronized with each other in order to match the timing of the music reproduced with the movements of the animation.

Also, the computation of the sense data by the spectrum analysis unit 1 is carried out in advance, and the reproduction of music by the MP3 decoder 5 and the output of video signals from the animation image generation unit 3 are performed thereafter at an interval of a few seconds to a few tens of seconds so that the speed of the music and the movements of the animation are not shifted even if the spectrum analysis unit 1 requires time for the operation to compute the sense data. However, if the rate of operation to compute the sense data by the spectrum analysis unit 1 is sufficiently high, it is possible to reproduce the sound and the image in real time without having the above-mentioned interval.

The MP3 data storage unit 4 may be realized by using a recording medium, such as a magnetic disc, CD-ROM (read-only memory using compact disc), CD-R (CD Recordable), DVD (Digital Versatile Disk), a magneto-optical disc, and semiconductor memory, and a device for reading the recording medium.

The spectrum analysis unit 1 may be realized by using a computer. That is, execution of processes, such as computation of sense data, which will be described later, is recorded in a recording medium that can be read by the computer as a computer program, and the program is read by the central processing unit of the computer to perform the command to realize its function, such as computation of the sense data. Here, the recording medium that can be read by the computer means, for instance, a magnetic disc, a CD-ROM, a CD-R, and a semiconductor memory. Also, it is possible to realize the spectrum analysis unit 1 as an integrated circuit loaded with special logic. Moreover, it is possible to receive the program via a communication means and performs the program by the central processing unit of the computer instead of recording the program in a recording medium which can be read by a computer.

The sense data accumulation unit 2 may be realized by using a recording medium which can be rewritten at high speed, such as a semiconductor memory and a magnetic disc.

Next, the internal structure of the spectrum analysis unit 1 and the processes carried out by the spectrum analysis unit 1 will be described in detail. As shown in FIG. 1, the spectrum analysis unit 1 includes a decompression unit 11 and a sense data computation unit 12 (a sense data computation device). The decompression unit 11 decompresses the music data which is read from the MP3 data storage unit.

That is, compressed data is transmitted at the point indicated by "A" shown in FIG. 1. On the other hand, data in which information on the above-mentioned sound pressure value at each frequency area (sound range) has been decompressed, is transmitted at the point "B" shown in FIG. 1. The sense data computation unit 12 includes a feeling analysis unit 13 and a rhythm analysis unit 14.

Next, processes performed by the feeling analysis unit 13 and the rhythm analysis unit 14 will be described in detail.

Figure 2:
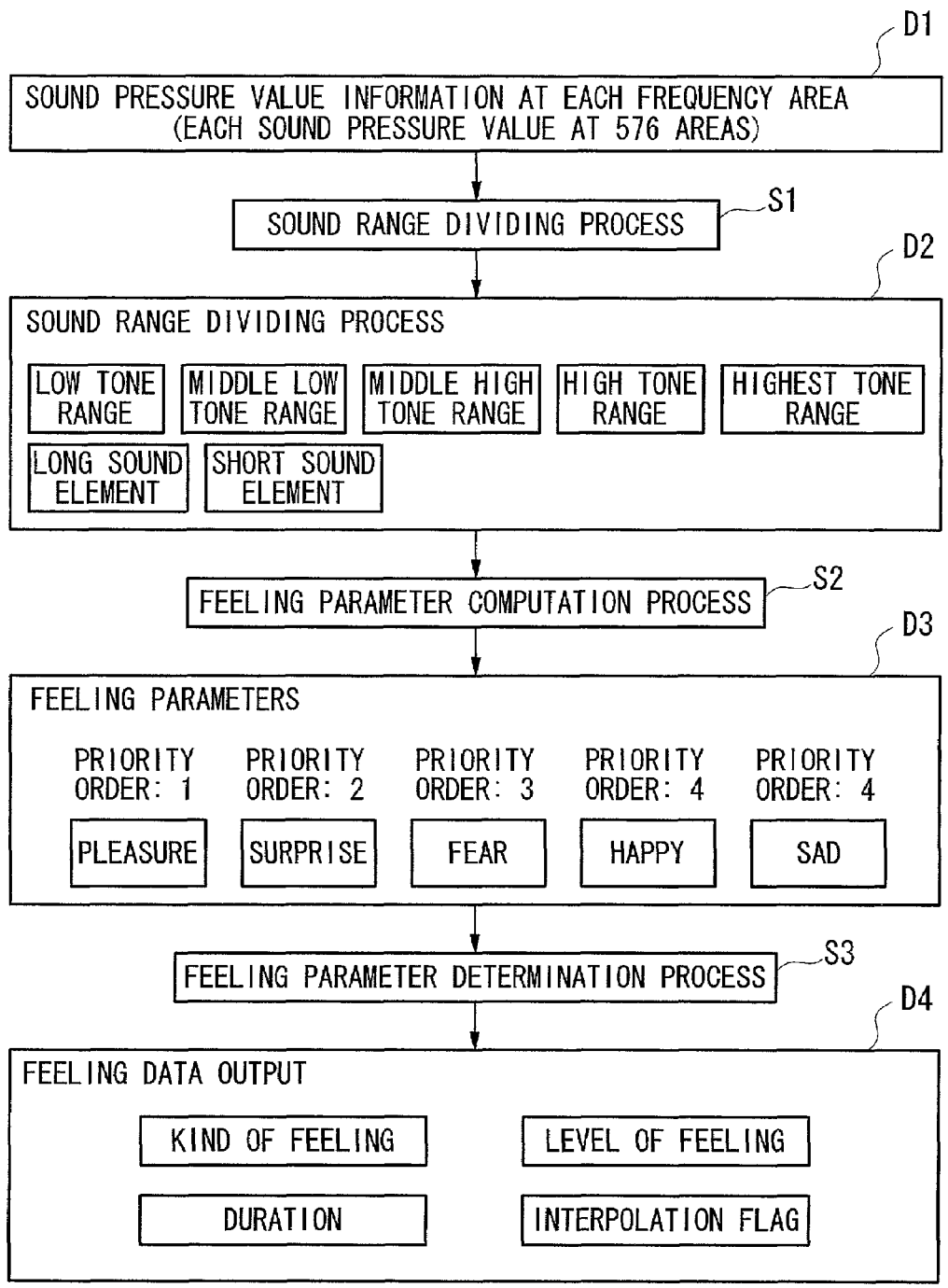
FIG. 2 is a flowchart showing a procedure of analysis process by the feeling analysis unit provided with the music reproducing device according to the embodiment of the present invention.

FIG. 2 is a flowchart showing the procedure of processes carried out by the feeling analysis unit 13. As shown in FIG. 2, the feeling analysis unit 13 first divides data into five sound ranges based on input data in step S1, and carries out a feeling parameter computation process based on the sound pressure values at the five sound ranges in step S2. Also, a determination process is performed based on the feeling parameters computed in step S3. As a result of the determination, time series data in combination of index, kinds of feelings, feeling levels, duration, and interpolation flag, is output.

The above-mentioned index is a sequential value started from zero.

The above-mentioned kinds of feelings include "default (emotionless)", "pleasure", "surprise", "fear", "happy", and "sad".

When the kinds of feelings is one of the "pleasure", "surprise", "fear", "happy", and "sad", the above-mentioned feeling levels takes an integer value between 1 and 5. Also, when the kinds of feelings is "default", the value of the feeling level is "none".

The above-mentioned duration is a value having a unit of a second, and takes a value equal to or greater than 1.

The above-mentioned interpolation flag takes a value of either zero (indicates "OFF") or 1 (indicates "ON").

The initial values used when the time series music data is treated are: index=zero; kinds of feelings="default"; feeling level="none"; duration="1", and interpolation flag="1".

Next, the processes of the present invention will be described further in detail.

The symbol D1 shown in FIG. 2 indicates sound pressure value information at each frequency area which is input to the feeling analysis unit 13. At this stage, the sound pressure information at each of the 576 frequency areas is maintained. Also, the sampling frequency of the original MP3 data is 44,100 Hz. That is, the above-mentioned sense data relating to the sound is computed by inputting digital data in which the sound is expressed as sound pressure values at each of the divided frequency area and analyzing the distribution of the sound pressure values at each of the frequency area using the method described below.

In step S1, an average sound pressure value at each of the following five sound ranges is calculated based on the sound pressure value information (D1), and outputs the results as a sound pressure value information (D2). The five sound ranges means a low tone range (0 Hz–76.5625 Hz), a middle low tone range (229.6875 Hz–1,990.625 Hz), a middle high tone range (7,005.469 Hz–10,029.69 Hz), a high tone range (10,029.69 Hz–14,967.97 Hz), and a highest tone range (15,006.25 Hz–17,992.19 Hz).

That is, in this embodiment, the entire frequency area is divided into frequency area groups, the number of which is ten or less, and a process of analysis using the sound pressure value for each of the frequency area groups is carried out.

Also, in step S1, long sound elements and short sound elements are extracted by dividing into sound scales. In order to carry out the extraction, the area between zero Hz and 497.6563 Hz is equally divided into 13 sound scale areas, and the area between 497.6563 Hz and 22,050 Hz is divided into 63 sound scale areas. Then, it is determined whether or not the sound pressure value of 24 sound scale areas between 497.6563 and 2,028.906 Hz, i.e., 2 octaves, is larger than a predetermined threshold value.

Among the above-mentioned sound scale areas, the $1^{st}$, $3^{rd}$, $5^{th}$, $8^{th}$, $10^{th}$, $12^{th}$, $13^{th}$, $15^{th}$, $17^{th}$, $20^{th}$, $22^{nd}$, and $24^{th}$ area are the long sound elements. Among these long sound elements, since the $1^{st}$ one and the $13^{th}$ one are separated by one octave, the long sound element is counted as +1 if the sound pressure values of both of the two areas are larger than the threshold value. Similarly, the $3^{rd}$ and the $15^{th}$ area, the $5^{th}$ and the $17^{th}$ area, the $8^{th}$ and the $20^{th}$ area, the $10^{th}$ and the $22^{nd}$ area, and the $12^{th}$ and the $24^{th}$ area, are separated by one octave, and the long sound element is counted as +1 when the sound pressure values of both of the areas are larger than the threshold value.

Also, among the above-mentioned 24 sound scale areas, each of the $2^{nd}$ and the $14^{th}$ area, the $4^{th}$ and the $16^{th}$ area, the $6^{th}$ and the $18^{th}$ area, the $7^{th}$ and the $19^{th}$ area, the $9^{th}$ and the $21^{st}$ area, and the $11^{th}$ and the $23^{rd}$ area forms a pair separated by one octave with respect to each other, and the short sound element is counted as +1 when the sound pressure values of both of the areas are larger than the threshold value.

As a result of the extraction, the long sound element and the short sound element take an integer value between zero and six.

Then, in step S2, a process for computing the feeling parameters is performed based on the sound pressure value information D2. The feeling parameters are prioritized, and the priority is 1 for "pleasure", 2 for "surprise", 3 for "fear", and 4 for both "happy" and "sad".

Note that when all of the above-mentioned five kinds of feeling parameters are "0", it corresponds to "default".

Also, in step S3, a determination based on the computed feeling parameters is made, and a process for obtaining sense data is carried out. Moreover, the result of rhythm analysis obtained from the rhythm analysis unit 14 shown in FIG. 1 is used in a part of the determination. The result of the rhythm analysis means, for instance, the degree of time interval between a beat.

Note that when the feeling parameter values are computed, sound having a sound pressure value of L1 or less is ignored.

Process relating to "pleasure" is as follows.

[Condition 1] When the time interval between beats is T3 or more, and the peak of any of the sound pressure from the middle low tone range to the high tone range is moved time T4 or more in the high tone direction, the count of the "pleasure" feeling parameter is increased by +1. When this condition is satisfied, it is assumed that the "pleasure" feeling starts when time T4 has been elapsed since the corresponding sound starts to sound, and that it continues until time T2 has been elapsed since the corresponding sound stops to sound. That is, animation based on the "pleasure" data is produced and output during this period.

[Condition 2] When the sound pressure value of the low tone range is L7 or higher, an average sound pressure value of the high tone range is L4 or higher, and an average sound pressure value is L6 or higher, if either a value obtained by subtracting the current time interval between beats from the previous average time interval between beats is T1 or greater or the previous determination result is "surprise", the count of the "pleasure" feeling parameter is increased by +2. When this condition is satisfied, it is assumed that the "pleasure" feeling starts when time T4 has been elapsed since the corresponding sound starts to sound.

That is, when the above condition 2 is applied, the sense data is computed based on the average sound pressure value of each of the divided frequency area group.

Also, when the above condition 1 is applied, the sense data is computed based on how the frequency area, which indicates the peak of the sound pressure value, changes in the frequency area group.

Moreover, when the above condition 1 is applied, the counts of beats per unit time of rhythm contained in sound is obtained based on the original digital data, and the sense data is computed based on the counts of beats per unit time. The above-mentioned "time interval between beats" may be obtained from the reciprocal number of the counts of beats per unit time.

Note that since the priority of the "pleasure" feeling is "1", which is the highest, the other feeling parameters are ignored if the situation applies to the above-mentioned condition 1 or 2.

Process relating to "surprise" is as follows.

If the situation does not apply to the above-mentioned conditions for "pleasure", it is determined whether or not it applies to the "surprise" using the conditions described below.

[Condition 1] When a sound having a sound pressure value of L7 or greater at a peak of the low tone range is obtained at first from a soundless state in which the average sound pressure value of the entire sound range is L3 or less, the count of the "surprise" feeling parameter is increased by +4, and the time the sound keeps sounding is regarded as the duration. However, if the condition 2 described below is satisfied, the condition 1 is ignored.

[Condition 2] When a sound having a sound pressure value of L7 or greater at a peak of the low tone range is obtained at first from a soundless state in which the average sound pressure value of the entire sound range is L2 or less, the count of the "surprise" feeling parameter is increased by +5, and the time the sound keeps sounding is regarded as the duration.

[Condition 3] When a sound having a sound pressure value of L7 or greater at a peak of other than the low tone range is obtained at first from a soundless state in which the average sound pressure value of the entire sound range is L3 or less, the count of the "surprise" feeling parameter is increased by +1, and the time the sound keeps sounding is regarded as the duration. However, if the condition 4 described below is satisfied, the condition 1 is ignored.

[Condition 4] When a sound having a sound pressure value of L7 or greater at a peak of other than the low tone range is obtained at first from a soundless state in which the average sound pressure value of the entire sound range is L2 or less, the count of the "surprise" feeling parameter is increased by +2, and the time the sound keeps sounding is regarded as the duration.

[Condition 5] When a sound of the highest tone range continues for time T4 or longer, or a sound of the highest tone range is present and the average sound pressure value of the middle high tone range is L4 or smaller, the count of the "surprise" feeling parameter is increased by +3, and the time the sound keeps sounding is regarded as the duration.

Note that the priority of the "surprise" feeling parameter is "2", which is next to that of the "pleasure" feeling parameter, the other feeling parameters whose priority are lower than 2 are ignored if the situation applies to any of the above-mentioned conditions 1–5.

Process relating to "fear" is as follows.

If the situation does not apply to either the above-mentioned conditions for "pleasure" or "surprise", it is determined whether or not it applies to the "fear" using the conditions described below.

[Condition 1] When a peak of any of the sound pressure values between the middle low tone range and the high tone range moves time T4 or more in the low tone direction, the count of the "fear" feeling parameter is increased by +1.

[Condition 2] When a peak of any of the sound pressure values between the middle low tone range and the high tone range moves time T4 or more in the low tone direction, and subsequently moves time T4 in the high tone direction, the count of the "fear" feeling parameter is increased by +4.

[Condition 3] If the number N is 42 or larger, which indicates a number that a peak of any of the sound pressure values between the middle low tone range and the high tone range moves to the high tone direction while moving to the low tone direction, the count of the "fear" feeling parameter is increased by +(N/16).

Note that the start of changing the animation based on the "fear" data is regarded as when time T4 has been elapsed since the subject sound starts to sound. Similarly, the end of the change of the animation is regarded as when time T2 has elapsed since the subject sound stops to sound.

Also, since the priority of the "fear" feeling is "3", which is next to that of "surprise", the other feelings of lower priority order are ignored if the situation applies to any of the above-mentioned conditions 1–3.

If the situation does not apply to any of the above-mentioned "pleasure", "surprise", or "fear", it is determined whether or not it applies to "happy" or "sad" using the following conditions.

Process relating to "happy" is as follows.

[Condition 1] If beats are present, the count of the "happy" feeling parameter is increased by +1.

[Condition 2] If a time interval between beats is T7 or longer, the count of the "happy" feeling parameter is increased by +1.

[Condition 3] If the average sound pressure value of the high tone range is L4 or higher, the count of the "happy" feeling parameter is increase by +1.

[Condition 4] If the above condition 3 is satisfied, and the number of peaks of the sound pressure value present at the middle low tone is 5 or more, the count of the "happy" feeling parameter is increased by +2.

[Condition 5] If the above conditions 3 and 4 are satisfied, and the average sound pressure value at the low tone range is L5 or less, the count of the "happy" feeling parameter is increased by +2.

[Condition 6] If the numeric value obtained by subtracting the extracted short sound element from long sound element is 2 or more, the count of the "happy" feeling parameter is increased by +1.

Note that the error in time for the start of the change of the animation based on the "happy" data is considered to be ±T2. Also, the error in time for the end of the change of the animation is considered to be ±T2.

Process relating to "sad" is as follows.

[Condition 1] When a time interval between beats is T5 or longer, the count of the "sad" feeling parameter is increased by +1.

[Condition 2] If beats are not present, the count of the "sad" feeling parameter is increased by +2.

[Condition 3] If there is a peak of the sound pressure value, which continues for time T4 or longer, at the middle low tone range, the "sad" feeling parameter is increase by +1, and the time the sound keeps sounding is regarded as the duration. However, if the condition 4 described below is satisfied, this condition is ignored.

[Condition 4] If there is a peak of the sound pressure value, which continues for time T6 or longer, at the middle low tone range, the "sad" feeling parameter is increase by +2, and the time the sound keeps sounding is regarded as the duration.

[Condition 5] If the number of peaks of the sound pressure value present at the high tone range is 3 or more, the count of the "sad" feeling parameter is increased by +1.

[Condition 6] If there is no sound having the average sound pressure value of L3 or more over the entire range, the "sad" feeling parameter is increased by +1.

[Condition 7] If there is no sound having the average sound pressure value of L3 or more over the entire range for time T2 or longer, the "sad" feeling parameter is increased by +1.

[Condition 8] If the average sound pressure value of the middle high tone range and the high tone range are L3 or less, and only sounds at the middle low tone range are obtained, the "sad" feeling parameter is increased by +2.

[Condition 9] If the numeric value obtained by subtracting the long sound element from the short sound element is 2 or more, the count of the "sad" feeling parameter is increased by +1.

Note that the error in time for the start of the change of the animation based on the "sad" data is considered to be ±T2. Also, the error in time for the end of the change of the animation is considered to be ±T2.

As explained above, each of the feelings of "pleasure", "surprise", "fear", "happy", and "sad" is checked using the conditions which are defined for each.

Then, when the count result of any of the "pleasure", "surprise", or "fear", in order of the higher priority, is 1 or greater, the corresponding feeling is determined to be the kind of feeling. Also, the count value obtained at that time is recognized as the level of feeling. However, even if the count value exceeds 5, the level of feeling is recognized as 5.

Note that when the kind of feeling is "fear", and a state in which the level of feeling is kept unchanged continues for time T5 or longer, a check is repeatedly made for every time T5.

Also, when the kind of feeling is "pleasure", and the level of feeling is changed from 2 to 1 while maintaining the same kind of feeling, the level of feeling thereafter is regarded as 2 and the level of feeling of 2 is considered to be maintained.

When the count value of all of the "pleasure", "surprise", and "fear" is zero, and the count value of at least one of the "happy" and "sad" is 1 or more, the count value of the "happy" and that of the "sad" are compared by using the method described below. First, the average of the previous count value of "happy" and the current count value of "happy" is obtained. Then, the average of the previous count value of "sad" and the current count value of "sad" is obtained. After this, the average count value of "happy" is compared with the average count value of "sad".

If the average count value of "happy" is larger, the kind of feeling is set to be "happy", and the value obtained by subtracting the average count value of "sad" from the average count value of "happy" is used as the level of feeling. On the other hand, if the average count value of "sad" is larger, the kind of feeling is set to be "sad", and the value obtained by subtracting the average count value of "happy" from the average count value of "sad" is used as the level of feeling.

If the average count value of "happy" is equal to the average count value of "sad", the previous count value of each is compared, and the one having a larger count value is selected as the kind of feeling, and the feeling level is set to be 1.

Note that the determination using the count value of "happy" and that of "sad" is not limited to the above-mentioned rules, and the following two exceptional patterns may apply.

The first exceptional pattern is a case where the count value of "happy" is 5, and the count value of "sad" is also 5. In this case, the kind of feeling and the feeling level are set to be "pleasure" and "2", respectively.

The second exceptional pattern is a case where the count value of "fear" is 3 or larger, and the count value of "sad" is 4 or larger. In this case, the kind of feeling and the feeling level are set to be "sad" and "5", respectively.

Note that when the result of the count value is zero for all of the above-mentioned five kinds of feelings, the kind of feeling is determined to be "default".

Next, a determination method relating to the interpolation flag will be explained. Although the default value for the interpolation flag is 1 (ON), the value of the interpolation flag is set to be zero (OFF) when the situation applies to the following two cases. First, when the same kind of feeling continues for time T6 or longer, the interpolation flag is set to be zero. Second, when the kind of feeling changes to "pleasure" from the previous kind of feeling of "happy" or "sad", the interpolation flag is set to be zero.

In the above-mentioned processes for the computation of the feeling parameters and the determination of feeling, a suitable value can be employed for the time T1–T6 which satisfies the relationship of T1<T2<T3<T4<T5<T6. Note that T1 is on the level of about a few hundred milliseconds, and T6 is on the level of about a few thousandmilli seconds. Also, a suitable value can be employed for the sound pressure value level L1–L7 which satisfies the relationship of L1<L2<L3<L4<L5<L6<L7. As an example, a value of about −50 dB (decibel) is used for L1, and a value of about −20 dB is used for L7.

Next, processes in the rhythm analysis unit 14 shown in FIG. 1 will be explained.

Data decompressed by the decompression unit is input into the rhythm analysis unit 14. The input data, as mentioned above, has information on the sound pressure value at each frequency area in time sequence. The rhythm analysis unit 14 analyzes the rhythm of the music based on the input data, and computes and outputs a bpm value (beat per minute, count of beats per unit time) of the music.

In the process of analyzing the rhythm, the following matters become prerequisite. First, the rhythm of the music is accurately beaten at a certain bpm value for at least a certain period of time. Second, a noise type sound is contained twice in one battuta. For instance, if the music has a quadruple rhythm, a noise type sound is contained eight times in a quadruple rhythm. Here, the noise type sound means, for example, a sound of cymbals.

The noise type sound is characterized by the presence of sound pressure changes over almost the entire frequency area. Accordingly, the noise type sound may be detected by obtaining the changing amount of the sound pressure between frames for each of the frequency areas, and detecting a case where the changing amount of the sound pressure exceeds a predetermined threshold value continuously over the whole frequency.

Then, since there is a tendency that noise type sounds concentrate on certain portions at a predetermined timing in accordance with its rhythm, the noise type sounds may be detected, and a detection interval is obtained using a frame unit (one frame is about 0.0261 second). At this stage, the intervals detected are not constant, and obtained as a distribution of frequency defined by the number of frames. The bpm value is obtained based on the distribution obtained by adding correction and determining the interval of the battuta.

That is, according to the above-mentioned second prerequisite, since the noise type sound is contained twice in one battuta, the bpm value may be obtained by the following formula using the noise interval F (frame unit) obtained. That is, $$bpm \text{ value} = 60[\sec/\min]/2*F[\text{frame}]*0.0261[\sec/\text{frame}]$$

Figure 3:
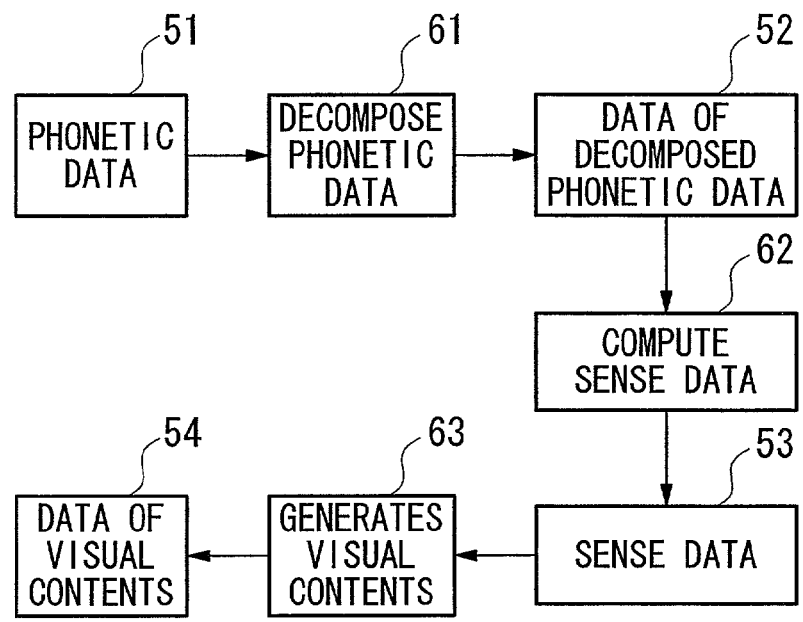
FIG. 3 is a schematic diagram showing a flow of data in the music reproducing device according to the present invention.

FIG. 3 is a schematic diagram showing the flow of data in the above-mentioned music sound reproducing device. As shown in the figure, decomposed sound data 52 can be obtained by subjecting sound data 51, which is used as the base, to a process (61) for decomposing it to each frequency area. Then, sense data 53 can be obtained by subjecting the obtained data to a process (62) for computing the sense data. After this, visual content data 54, such as animation, can be produced by subjecting the obtained sense data 53 to a process (63) for producing visual contents.

A spectrum analysis device which outputs optical signals in accordance with sound data of each frequency area has been conventionally employed. However, the music sound reproducing device according to the embodiment of the present invention has an effect that signals or contents can be produced, which match with a music reproduced and with the sense of the audience who listen to the music, by generating sense data from sound data of each frequency area, and subsequently generating visual data based on the sense data generated. This kind of effect has never been realized by using the conventional techniques.

Next, another embodiment according to the present invention will be explained.

In the configuration shown in FIG. 1, although sense data is computed and accumulated based on MP3 data which has been prestored in recording medium, etc., it is possible to compute the sense data in a similar manner based on audio signals which are externally input.

Figure 4:
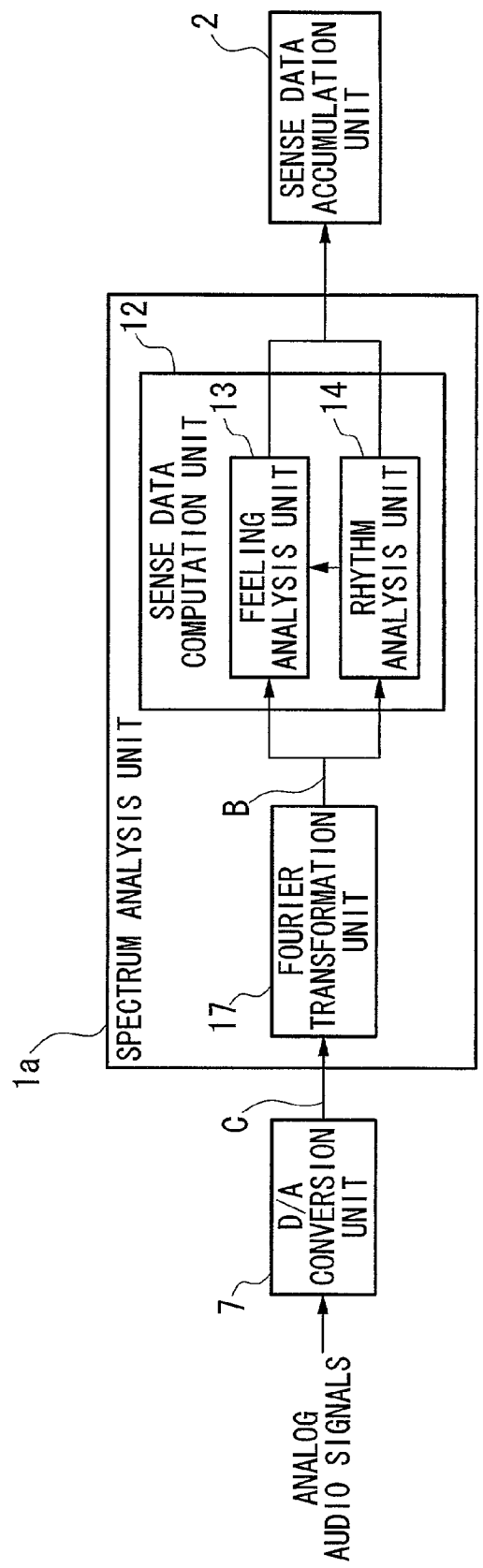
FIG. 4 is a block diagram showing a configuration of a sense data computing device according to another embodiment of the present invention.

FIG. 4 is a block diagram showing a configuration of sense data computation device which computes and accumulates sense data based on inputted analog audio signals. In FIG. 4, the numeral 7 indicates an A/D (analog/digital) conversion unit, and 1a indicates a spectrum analysis unit. The spectrum analysis unit 1a includes a Fourier transformation unit 17, and a sense data computation unit 12.

The A/ID conversion unit 7 converts inputted analog audio signals to time series digital sound pressure value data (C) of a predetermined sampling frequency. Then, the digital sound pressure value data (C) is converted into sound pressure value data of each frequency area, based on a frame having a predetermined frame length, by the Fourier transformation unit 17. The function of the sense data computation unit 12 is the same as the one shown in FIG. 1, and computes sense data using the same method as described above.

Although sense data is computed based on audio data which expresses, for instance, music, in the device shown in FIGS. 1 and 4, it is possible to compute the sense data based on data relating to sensations other than the sense of hearing.

Figure 5:
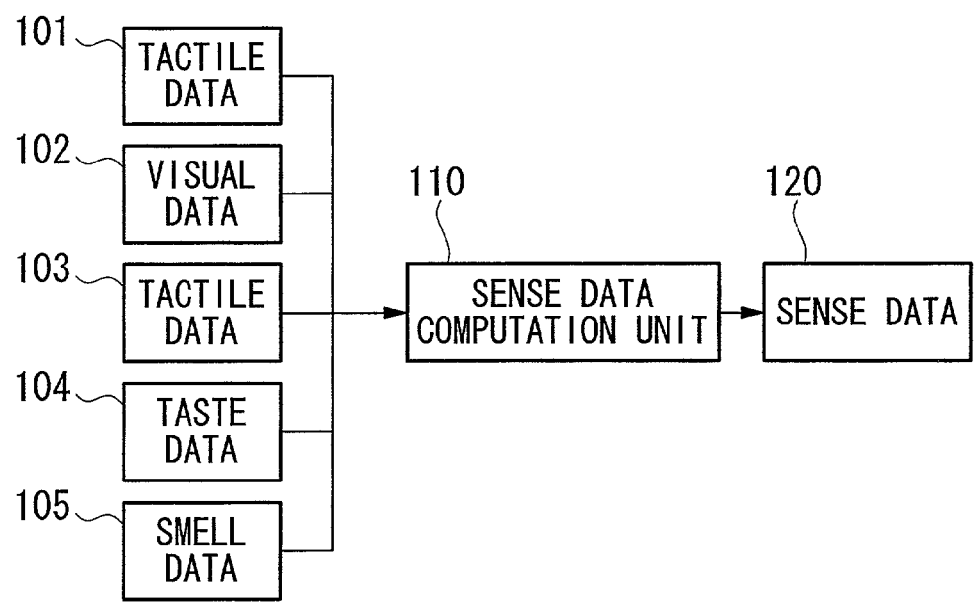
FIG. 5 is a block diagram showing a schematic structure of a sense data computation device which computes sense data based on data relating to audience or other sensations according to another embodiment of the present invention.

FIG. 5 is a block diagram showing a schematic structure of a more general sense data computation device. In FIG. 5, the numeral 101 indicates audio data, 102 indicates visual data, 103 indicates tactile data, 104 indicates taste data, and 105 indicates smell data. These data (101–105) are digitalized using an appropriate method in accordance with the characteristics of each sensation. Also, these data (101–105) are sometimes expressed as time series data.

The numeral 110 indicates a sense data computation unit, and the sense data computation unit 110 computes sense data 120 in accordance with a predetermined procedure based on all or a part of the audio data 101, the visual data 102, the tactile data 103, the taste data 104, and the smell data 105. In addition, the sense data 120 may also be expressed as time sequence data.

The method and device for computing sense data based on data relating to the human sensations have been described. Possible examples of application of these are as follows.

The music sound reproducing device shown in FIG. 1 may be utilized as a device capable of reproducing music and animation at the same time. Also, by realizing the function of the music sound reproducing device as a computer program, a music sound reproducing device, which can be actuated by using a personal computer, a personal digital assistance (PDA), or a portable communication terminal, may be realized. At that time, audio data (music), etc., may be distributed by using communication means such as the Internet, a fixed pay phone network, and a portable phone network, instead of prestoring it in a recording device.

Also, it is possible to display information corresponding to the sense of music on a displaying device, for example, a karaoke sing-along machine, by analyzing the music to be played and computing sense data.

Moreover, it is possible to control movements or expressions of a robot (for instance, a so-called pet type robot, and an entertainment robot) in accordance with sense data by computing the sense data based on stimulations (e.g., sound, light, or oscillation) from the external environment.

Further, it is possible to distinguish original music by using sense data which is computed based on digital music contents. In this manner, it becomes possible to readily distinguish a digital music content, which may be circulated via a network, etc., belonging to certain pieces of music. Accordingly, it becomes possible to detect an illegal copy of the content. The advantage of this method is that the size of computed sense data is significantly smaller than that of the original sound data, and hence, the comparison can be made by comparing a small amount of data. In addition, according to the experience of the inventors of the present invention, it is understood that although the amount of information of sense data is significantly smaller than that of the original sound data, the sense data contains sufficient information for distinguishing certain pieces of music. That is, there has been no case in which sense data of a certain piece of music completely matches that of a different pieces of music, and hence, the possibility of occurrence of such case is considered to be extremely small.

Having thus described exemplary embodiments of the present invention with reference to the drawings, it will be apparent that concrete configurations of the present invention are not limited to the ones described above in the particular embodiments, and it is intended to include all within the spirit and scope of the invention.

As explained above, according to the present invention, since sense data relating to a sound is computed by inputting digital data in which sound is expressed as a sound pressure value at each of divided frequency areas, and analyzing distribution of the sound pressure value at each of the frequency area, sense data relating to the inputted sound can be automatically produced. Accordingly, it is not necessary that a person make a determination and input a result of the determination each time.

Also, according to the present invention, since the frequency areas as a whole is divided into frequency area groups of ten or less, and the sense data is computed based on an average sound pressure value of each of the frequency area groups, it is possible to simplify the computation process to carry out calculation with a relatively small number of calculations.

Also, according to the present invention, count of beats per unit time of a rhythm contained in a sound is obtained, and the sense data is computed based on the count of beats per unit time. Accordingly, sense data close to a human sense can be obtained using relatively simple processes.

Also, according to the present invention, sense data is computed by using the above-mentioned sense data computation method based on digital data which expresses a music, visual contents are produced based on the computed sense data, and the reproduction of the music and the display of the visual contents are carried out in a synchronized manner. Accordingly, it becomes possible to display visual contents which match the sense of the music in a synchronized manner, and to improve expressivity during the reproduction.

Also, according to the present invention, sense data is computed by using the above-mentioned sense data computation method based on digital data which expresses a music, and the music is distinguished by comparing each of the sense data computed, it becomes possible to distinguish the music using a smaller amount of data. Accordingly, transactions, such as detection of illegal copies of digital contents, can be efficiently carried out.

What is claimed is:

1. A method for computing sense data comprising the steps of:
    inputting digital data in which a sound is expressed as a sound pressure value at each of divided frequency areas,
    analyzing temporal transition of distribution of said sound pressure value at each said frequency area,
    computing an amount of change in said sound pressure value at each said frequency area with respect to time,
    analyzing distribution of a region over an entire frequency area at which said amount of change in said sound pressure value exceeds a predetermined threshold value;
    computing feeling parameter values of five kinds of feeling comprising "pleasure", "surprise", "fear", "happy", and "sad" based on the distribution of said sound pressure value at each said frequency area,
    extracting long sound elements and short sound elements based on said sound pressure value at each frequency area divided into sound scales,
    counting said sound elements wherein a long sound element is counted as +1 when pressure values of both of two areas of a long sound element separated by one octave are larger than a threshold value and a short sound element is counted as +1 when pressure values of both of two areas of a short sound element are larger than a threshold value, and
    computing said feeling parameter wherein the count of the "happy" parameter is increased by +1 when the numeric value obtained by subtracting the counted value of a short sound element from the counted value of a long sound element is 2 or more and the count of the "sad" long sound element from the counted value of a short sound element is 2 or more, to compute sense data based on each of said feeling parameters.

2. A method for computing sense data according to claim 1, wherein
    said frequency areas as a whole are divided into frequency area groups of ten or less, and
    said sense data is computed based on an average sound pressure value of each of said frequency area groups.

3. A method for computing sense data according to claim 2, wherein said sense data is computed based on a manner of temporal transition of a frequency area having a peak of said sound pressure value in said frequency area groups.

4. A method for computing sense data according to claim 1, wherein
    count of beats per unit time of a rhythm contained in said sound is obtained based on said digital data, and
    said sense data is computed based on said count of beats per unit time.

* * * * *